United States Patent
Chang

(10) Patent No.: US 10,061,410 B2
(45) Date of Patent: Aug. 28, 2018

(54) TRANSMITTER SET FOR CONCURRENT TRANSMISSION, TRANSMITTING METHOD THEREOF, AND TOUCH SENSITIVE SYSTEM

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 254 days.

(21) Appl. No.: 14/537,368

(22) Filed: Nov. 10, 2014

(65) Prior Publication Data

US 2015/0130735 A1    May 14, 2015

Related U.S. Application Data

(60) Provisional application No. 61/902,137, filed on Nov. 8, 2013.

(30) Foreign Application Priority Data

Dec. 31, 2013    (TW) .............................. 102149232 A

(51) Int. Cl.
   G06F 3/044    (2006.01)
   G06F 3/038    (2013.01)
   (Continued)

(52) U.S. Cl.
   CPC .......... *G06F 3/0383* (2013.01); *G06F 3/0354* (2013.01); *G06F 3/03543* (2013.01);
   (Continued)

(58) Field of Classification Search
   CPC . G06F 3/03838; G06F 3/0354; G06F 3/03545
   See application file for complete search history.

(56) References Cited

U.S. PATENT DOCUMENTS

| 6,924,793 B2 | 8/2005 | Sharma |
| 8,773,404 B2 | 7/2014 | Wei et al. |

(Continued)

FOREIGN PATENT DOCUMENTS

| CN | 1487464 | 4/2004 |
| CN | 101539816 | 9/2009 |

(Continued)

*Primary Examiner* — Carolyn R Edwards
(74) *Attorney, Agent, or Firm* — WPAT, PC

(57) ABSTRACT

The present invention provides a set of transmitters which transmits signals concurrently. The set comprises a first role transmitter configured to transmit a first electrical signal according to a first role transmitter status to a touch sensitive device; and a second role transmitter configured to transmit a second electrical signal according to a second role transmitter status to said touch sensitive device. In consequence, the touch sensitive device is configured to analyze the first and the second electrical signals concurrently transmitted and to get the first and the second role transmitter status as well as a first relative position between the first role transmitter and the touch sensitive device and a second relative position between the second role transmitter and the touch sensitive device.

21 Claims, 11 Drawing Sheets

(51) Int. Cl.
*G06F 3/041* (2006.01)
*G06F 3/0354* (2013.01)

(52) U.S. Cl.
CPC .......... *G06F 3/03545* (2013.01); *G06F 3/044* (2013.01); *G06F 3/0416* (2013.01); *G06F 2203/0382* (2013.01); *G06F 2203/04104* (2013.01)

(56) References Cited

U.S. PATENT DOCUMENTS

| | | |
|---|---|---|
| 9,218,070 B2 | 12/2015 | Oda et al. |
| 2007/0188478 A1* | 8/2007 | Silverstein .......... G06F 3/03542 345/179 |
| 2010/0085325 A1 | 4/2010 | King-Smith et al. |
| 2011/0169756 A1* | 7/2011 | Ogawa ................ G06F 3/03545 345/173 |
| 2012/0326910 A1* | 12/2012 | Hargreaves ............ G08C 19/12 341/176 |
| 2014/0354605 A1* | 12/2014 | Kurita ................ G06F 3/03545 345/179 |
| 2015/0234534 A1* | 8/2015 | Fann .................... G06F 3/0416 345/175 |

FOREIGN PATENT DOCUMENTS

| | | |
|---|---|---|
| CN | 101714037 | 5/2010 |
| CN | 102109923 | 6/2011 |
| CN | 202563463 | 11/2012 |
| JP | 4117751 | 7/2000 |
| JP | 2000200142 A * | 7/2000 |
| TW | M255462 | 1/2005 |
| TW | 201305859 | 2/2013 |
| TW | 201339904 | 10/2013 |

\* cited by examiner

TRANSMITTER SET FOR CONCURRENT TRANSMISSION, TRANSMITTING METHOD THEREOF, AND TOUCH SENSITIVE SYSTEM

BACKGROUND OF THE INVENTION

1. Field of the Invention

The present invention relates to transmitters applicable to touch sensitive panels, and more particularly, to a set of transmitters which transmit signals concurrently.

2. Description of the Prior Art

Touch sensitive panels or screens are important human-machine interfaces, especially on consumer electronic products like portable phones, tablet PCs, or Personal Digital Assistances (PDAs). Touch sensitive screens are one of the main input/output (I/O) devices. Since capacitive touch sensitive screens, especially those of projected capacitive types, are very sensitive to finger touches, it has become one of the main design choices for touch sensitive panels/screens on the market.

Touching the screen with the tip of a finger will inevitably block part of the screen, such that the user cannot confirm a point that is being detected by the touch sensitive with his/her eyes. In addition, one cannot have as accurate control as using a pen (or stylus) when using their finger tip(s) to write. Therefore, in addition to using the finger tips to touch the screen, the user may also wish to use a stylus for input to the screen.

Generally, the touch area on a touch sensitive screen made by a stylus is much smaller than that made by the fingertips. For capacitive touch sensitive screens, it is a challenge to detect the capacitive changes caused by a stylus. In particular, in many professional graphics or typesetting application environments, a lot of functional buttons needs to be added in designing a stylus. In view of this demand, the touch sensitive screen not only needs to detect the tiny tip of the stylus, but also needs to determine whether these buttons are being pressed. Under certain circumstances, in addition to detect a single stylus, the touch sensitive screen needs to detect a plurality of styli concurrently writing or drawing thereon.

In summary, there is a need on the market for a set of styli that support multiple function inputs, thereby allowing a touch sensitive screen to detect a plurality of styli while detecting the statues of the functional buttons of each stylus.

SUMMARY OF THE INVENTION

In an embodiment, the present invention provides a set of transmitters which transmits signals concurrently. The set may include a first role transmitter configured to transmit a first electrical signal according to a first role transmitter status to a touch sensitive device; and a second role transmitter configured to transmit a second electrical signal according to a second role transmitter status to said touch sensitive device. In consequence, the touch sensitive device is configured to analyze the first and the second electrical signals concurrently transmitted and to get the first and the second role transmitter statuses as well as a first relative position between the first role transmitter and the touch sensitive device and a second relative position between the second role transmitter and the touch sensitive device.

In another embodiment, the present invention provides a transmitting method applicable to a set of transmitters which transmit signals concurrently. The transmitter set includes a first role transmitter and a second role transmitter. The transmitting method may include: generating a first role transmitter status according to a status of the first role transmitter; generating a second role transmitter status according to a status of the second role transmitter; configuring the first role transmitter to transmit a first electrical signal according to the first role transmitter status; and configuring the second role transmitter to transmit a second electrical signal concurrently according to the second role transmitter status, enabling a touch sensitive device to analyze the first and the second electrical signals concurrently transmitted and to get the first and the second role transmitter statuses as well as a first relative position between the first role transmitter and the touch sensitive device and a second relative position between the second role transmitter and the touch sensitive device.

In still another embodiment, the present invention provides a touch sensitive system, which may include said first role transmitter, said second role transmitter and said touch sensitive device.

In summary, one of the principles of the present invention lies in providing a set of transmitters which transmit different electrical signals, thereby allowing a touch sensitive device to obtain the statues of various transmitters according to the different electrical signals as well as relative positions between the respective transmitters and the touch sensitive device.

DETAILED DESCRIPTION OF THE PREFERRED EMBODIMENTS

Figure 1:
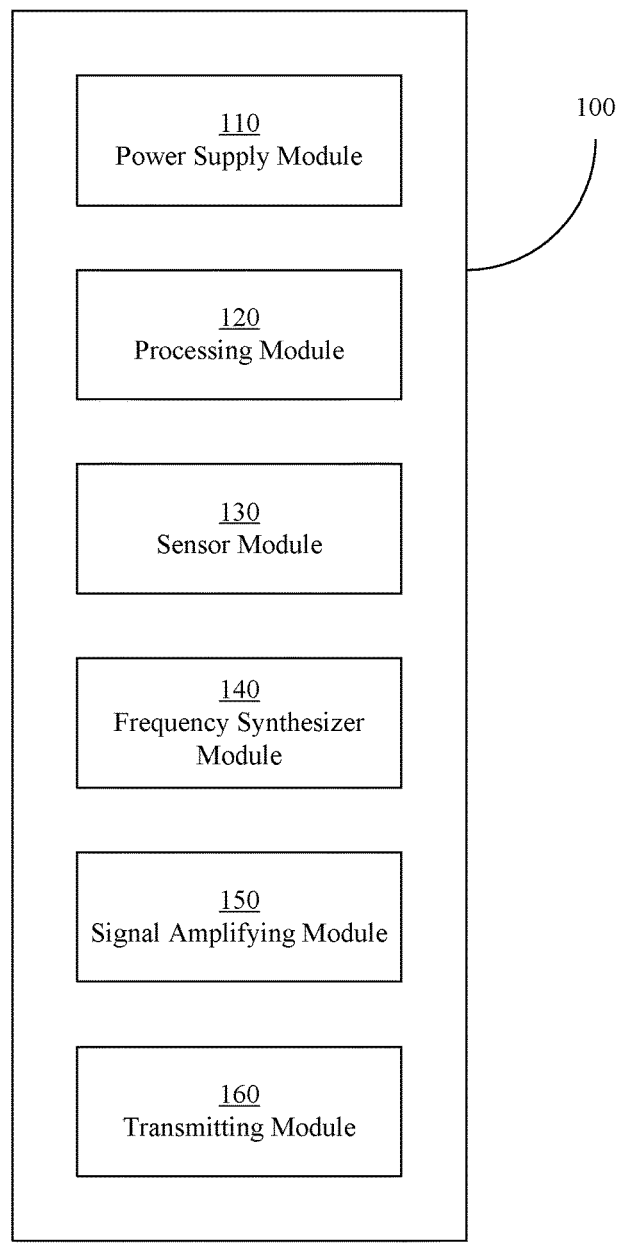
FIG. 1 is a schematic diagram illustrating a transmitter in accordance with an embodiment of the present invention.

The present invention is described in details with reference to some embodiments below. However, in addition to the disclosed embodiments, the scope of the present invention is not limited by these embodiments, rather by the scope of the claims. Moreover, in order for one with ordinary skills in the art to have a better understanding and clarity of the descriptions, some components in the drawings may not necessary be drawn to scale, in which some may be exaggerated relative to others, and irrelevant parts are omitted.

In an embodiment, the transmitter mentioned in the present invention may be a stylus. In some embodiments, the transmitter may be other types of objects that can be placed on a touch sensitive panel or screen. For example, when the touch sensitive screen displays a chessboard, the transmitter may be the chess. Once the game program detects the location of the chess on the touch sensitive screen, it will know the location of the chess.

Regardless of how much contact area there is between the transmitter and the touch sensitive panel and how many touch points there are, the transmitter at least includes a transmitting anchor point. The touch sensitive panel or screen may detect the location of the transmitting anchor point as the representative location of an object represented by the transmitter on the touch sensitive panel or screen. In an embodiment, the transmitter does not need to come into contact with the touch sensitive panel, only the transmitting anchor point needs to be in proximity to the touch sensitive panel for the touch sensitive panel to detect the transmitting anchor point.

In an embodiment, the transmitter may include a plurality of transmitting anchor points. When the touch sensitive panel detects a plurality of transmitting anchor points, it is able to detect the facing direction of the transmitter. In another embodiment, the transmitter may include m transmitting anchor points, and when the touch sensitive panel detects n of the transmitting anchor points, it is able to detect the stance of the transmitter on the touch sensitive panel. For example, the transmitter is a triangular body with four transmitting anchor points; each transmitting anchor point is positioned at one vertex of the triangular body, by detecting three transmitting anchor points on the touch sensitive panel, the touch sensitive panel will be able to know which face of the triangular body is in contact with it. The transmitter may also be a square body with eight transmitting anchor points, where each transmitting anchor point is positioned at a vertex of the square body. This type of transmitter can be used as a dice.

Referring to FIG. 1, a schematic diagram illustrating a transmitter 100 in accordance with an embodiment of the present invention is shown. The transmitter 100 includes a power supply module 110, a processing module 120, a sensor module 130, a frequency synthesizer module 140, a signal amplifying module 150 and a transmitting module 160. As mentioned above, the transmitter 100 may assume the shape of a stylus. In an embodiment, the above modules may be arranged inside the stylus according to the order shown in FIG. 1, the bottom of the stylus is to be in contact with or proximity to a touch sensitive panel. The transmitter 100 may include a master switch for turning on/off the power of the transmitter 100.

The power supply module 110 may include circuits associated with power supply and control, such as a battery pack, a DC-to-DC voltage converter, a power management unit and the like. The battery pack can be rechargeable batteries or disposable batteries. When the battery pack includes rechargeable batteries, the power supply module 110 may further include a charger circuit for inputting an external power into the rechargeable batteries. In an embodiment, the charger circuit can be included in the power management unit for protecting the rechargeable batteries from over discharging and over charging.

The above processing module 120 is used for controlling the transmitter 100, and may include a microprocessor. The above sensor module 130 may include at least one sensor. The sensor may, for example, include a pressure sensor at the tip of the stylus, a button, an accelerometer, an inductance meter, a knob, or the like. The status of the sensor may be in binary form. For example, the button may be in either a pressed-down status or a released status. The statuses of an accelerometer may include stationary and in motion. The statuses of the sensor may include n-ary discrete values. For example, the pressure experienced by the pressure sensor may be divided into four levels, ten levels, or sixteen levels. The statuses of the knob may also be in four levels, ten levels, or sixteen levels. The status of the sensor can also be an analog interval. The above processing module 120 is able to detect the status of the sensor in the sensor module 130, and generate a transmitter status accordingly.

The above frequency synthesizer module 140 includes a plurality of frequency generators and a frequency synthesizer or mixer. In one embodiment, the above plurality of frequency generators may include a plurality of quartz oscillators. In another embodiment, the above frequency generators can use a single frequency source, and generate a plurality of frequencies through the use of dividers, frequency multipliers, phase lock circuits and other appropriate circuitries. These frequencies are not mutually resonant frequency waves, and different from and not mutually resonant with the frequency emitted by the touch sensitive panel for detecting the transmitter 100. This avoids interference between the various frequencies.

In some embodiments, the ranges of the plurality of frequencies fall within the detectable frequency range of the touch sensitive panel. For example, a frequency range that generally can be detected by a touch sensitive panel is approximately between 90 kHz and 250 kHz, so the frequencies generated by the plurality of frequency generators may fall within this range.

In an embodiment, the above processing module 120 may decide which frequencies in the plurality of frequencies are to be synthesized by the frequency synthesizer module 140. In other words, a specific frequency can be controlled not to be added to the mixer. Of course, the signal strength of an individual frequency may also be controlled. In another embodiment, the above processing module 120 may decide the ratios of the signal strengths of the various frequencies for the frequency synthesizer module 140. For example, the ratio of the signal strength of a first frequency to that of a second frequency may be 3:7. As another example, the ratio of the signal strengths between a first, a second and a third frequency may be 24:47:29. One with ordinary skills in the art can appreciate that although the frequency synthesizer module 140 can be used for generating and mixing multiple frequencies, the processing module 120 may also instruct the frequency synthesizer module 140 to generate a single frequency without mixing with any other frequencies based on the statuses of the sensors in the sensor module 130.

In an embodiment, the signal strength of a particular frequency may correspond to a pressure sensor at the tip of the stylus or a knob with multiple levels in the sensor module 130. For example, in a graphics software, the pressure sensor at the tip of a stylus may indicate the shades of the color, and the degree of rotation of the knob may indicate the diameter of the brush. Thus, the signal strength of a first frequency can be used to indicate the pressure on the pressure sensor, and the signal strength of a second frequency can be used to indicate the degree of rotation of the knob.

In another embodiment, the proportion of the signal strength of one frequency among the signal strength of the mixed frequencies can be used to correspond to one of the n-ary statuses of a sensor. For example, when the ratio of the signal strengths of a first frequency to a second frequency is 3:7, it indicates the status of the sensor is in the third level among ten levels. If the ratio of the strengths is changed to 6:4, this indicates the status of the sensor is in the sixth level among ten levels. In other words, if there are three frequencies, then the ratio of the signal strengths of a first frequency to a second frequency, the ratio of the signal strengths of the second frequency to a third frequency, and the ratio of the signal strengths of the third frequency to the first frequency can be used to indicate three statuses of the n-ary sensor, respectively.

The above signal amplifying module 150 is used for amplifying the signal mixed by the frequency synthesizer module 140. In an embodiment, the above signal amplification corresponds to the pressure sensor in the sensor module 130 at the tip of the stylus. If the circuit of the pressure sensor corresponds to a variable gain amplifier (VGA) of the signal amplifying module 150, the circuit of the pressure sensor may directly control the gain of the VGA without going through the processing module 120. Therefore, the mixed signal outputted by the frequency synthesizer module 140 can be amplified by the VGA and sent to the transmitting module 160.

As mentioned before, the signal strength of a particular frequency in the mixed signal can be used to indicate a status of an n-ary sensor. The ratio of the signal strengths of two frequencies in the mixed can also be used to indicate a status of another n-ary sensor. Meanwhile, the signal amplifying module 150 can be use to amplify the mixed signal to indicate the status of yet another n-ary sensor. For example, the transmitter 100 includes two n-ary sensors: one is a pressure sensor provided at the tip of the stylus, and the second one is a knob provided on the body of the stylus, they are used to indicate the color shade and the diameter of the stylus, respectively. In an embodiment, the strength of the mixed signal can be used to indicate the degree of pressure experienced by the pressure sensor. The status of the knob can be indicated by the ratio of the signal strengths of two frequencies in the mixed signal.

In an embodiment of the present invention, the transmitting module 160 includes a pressure sensor provided at the tip of the stylus. The transmitting module 160 can be an array of antennas or a conductor or an electrode with the appropriate impedance value, which can also be called an excitation electrode. The conductor or electrode at the tip of the stylus is connected to the pressure sensor. When the transmitting module 160 emits a signal and touches the touch sensitive panel/screen, the signal will flow into the sensing electrodes of the touch sensitive panel/screen. When the transmitting module 160 is near but not in contact with the touch sensitive panel/screen, the sensing electrodes of the touch sensitive panel/screen may still experience the signal variations on the transmitting module 160, thereby allowing the touch sensitive/panel to detect the approaching of the transmitter 100.

When the frequency synthesizer module 140 synthesizes n frequencies, the frequencies of the signal can be used to modulate $2^n$ statues. For example, when n equals to three, the frequencies of the signal can be used to modulate eight statues. Referring to Table 1, the transmitter statuses and their corresponding statuses of the sensors are shown.

TABLE 1

|  | Pressure Sensor | First Button | Second Button |
| --- | --- | --- | --- |
| First Transmitter Status | Contact Pressure | Released | Released |
| Second Transmitter Status | Contact Pressure | Pressed | Released |
| Third Transmitter Status | Contact Pressure | Pressed | Pressed |
| Fourth Transmitter Status | Contact Pressure | Released | Pressed |
| Fifth Transmitter Status | No Contact Pressure | Released | Released |
| Sixth Transmitter Status | No Contact Pressure | Pressed | Released |
| Seventh Transmitter Status | No Contact Pressure | Pressed | Pressed |
| Eighth Transmitter Status | No Contact Pressure | Released | Pressed |

In the embodiment shown by Table 1, the sensor module 130 includes three sensors: a pressure sensor at the tip of the stylus, a first button and a second button. The status of these three sensors are all in binary forms, so there are eight different combinations of transmitter statuses in total, as shown in Table 1. One with ordinary skills in the art can appreciate that the correspondence between the transmitter statuses and the sensors' statuses can be arbitrarily changed. For example, the first transmitter status can swap with another transmitter status, for example, the seventh transmitter status.

Referring to Table 2, the transmitter statuses and their corresponding frequency mixings are shown. As described before, the frequency synthesizer module 140 may synthesize three different frequencies, so each transmitter status may correspond to a different combination of the frequencies as shown in Table 2. One with ordinary skills in the art can appreciate that the correspondence between the transmitter statuses and the combinations of frequencies can be arbitrarily changed. For example, the first transmitter status can swap with another transmitter status, for example, the eighth transmitter status.

TABLE 2

|  | First Frequency | Second Frequency | Third Frequency |
| --- | --- | --- | --- |
| First Transmitter Status | Mixed | Mixed | Mixed |
| Second Transmitter Status | Mixed | Mixed | Not Mixed |
| Third Transmitter Status | Mixed | Not Mixed | Not Mixed |
| Fourth Transmitter Status | Mixed | Not Mixed | Mixed |
| Fifth Transmitter Status | Not Mixed | Mixed | Mixed |
| Sixth Transmitter Status | Not Mixed | Mixed | Not Mixed |
| Seventh Transmitter Status | Not Mixed | Not Mixed | Not Mixed |
| Eighth Transmitter Status | Not Mixed | Not Mixed | Mixed |

In an embodiment, when the pressure sensor at the tip of the stylus is not under any pressure, the transmitter 100 still mixes the frequencies and sends out a signal. In another embodiment, when the pressure sensor at the tip of the stylus is not under any pressure, the transmitter 100 does not mix the frequencies and transmit any signal. With respect to Table 2, this status is the seventh transmitter status. In this embodiment, Table 1 can be altered into Table 3.

TABLE 3

|  | Pressure Sensor | First Button | Second Button |
| --- | --- | --- | --- |
| First Transmitter Status | Contact Pressure | Released | Released |
| Second Transmitter Status | Contact Pressure | Pressed | Released |
| Third Transmitter Status | Contact Pressure | Pressed | Pressed |
| Fourth Transmitter Status | Contact Pressure | Released | Pressed |
| Seventh Transmitter Status | No Contact Pressure | Released | Released |
| Seventh Transmitter Status | No Contact Pressure | Pressed | Released |
| Seventh Transmitter Status | No Contact Pressure | Pressed | Pressed |
| Seventh Transmitter Status | No Contact Pressure | Released | Pressed |

In the embodiments shown in Table 1 to Table 3, the transmitter 100 uses the synthesizing of the frequencies as the only factor of signal modulation. In the following embodiments, in addition to frequency synthesizing, signal strength and/or ratio of signal strengths of different frequencies are included as the factors of signal modulation.

Referring to Table. 4, transmitter frequency statuses and their corresponding sensors' statuses in accordance with an embodiment of the present invention are shown. Compared to the embodiment shown in Table 1, the statues sensed by the pressure sensor are not limited to two statuses (i.e. contact pressure/no contact pressure), but more than two statuses. Thus, the left column of Table 4 is not called transmitter status anymore, but rather transmitter frequency status. The modulation factors of the transmitter status of this embodiment include, in addition to the frequency status, the signal strength as well.

TABLE 4

|  | Pressure Sensor | First Button | Second Button |
| --- | --- | --- | --- |
| First Transmitter Frequency Status | Contact Pressure Level > 0 | Released | Released |
| Second Transmitter Frequency Status | Contact Pressure Level > 0 | Pressed | Released |
| Third Transmitter Frequency Status | Contact Pressure Level > 0 | Pressed | Pressed |
| Fourth Transmitter Frequency Status | Contact Pressure Level > 0 | Released | Pressed |
| Fifth Transmitter Frequency Status | Contact Pressure Level = 0 | Released | Released |
| Sixth Transmitter Frequency Status | Contact Pressure Level = 0 | Pressed | Released |
| Seventh Transmitter Frequency Status | Contact Pressure Level = 0 | Pressed | Pressed |
| Eighth Transmitter Frequency Status | Contact Pressure Level = 0 | Released | Pressed |

Referring to Table 5, transmitter statuses and their corresponding frequency mixings and signal strengths in accordance with an embodiment of the present invention are shown. The signal strength modulation can be the signal strength value of the mixed signal to indicate, for example, the contact pressure level of the pressure sensor.

TABLE 5

|  | First Frequency | Second Frequency | Third Frequency |
| --- | --- | --- | --- |
| First Transmitter Frequency Status + Signal Strength Modulation | Mixed | Mixed | Mixed |
| Second Transmitter Frequency Status + Signal Strength Modulation | Mixed | Mixed | Not Mixed |
| Third Transmitter Frequency Status + Signal Strength Modulation | Mixed | Not Mixed | Not Mixed |
| Fourth Transmitter Frequency Status + Signal Strength Modulation | Mixed | Not Mixed | Mixed |
| Fifth Transmitter Frequency Status + Signal Strength Modulation | Not Mixed | Mixed | Mixed |
| Sixth Transmitter Frequency Status + Signal Strength Modulation | Not Mixed | Mixed | Not Mixed |
| Seventh Transmitter Frequency Status + Signal Strength Modulation | Not Mixed | Not Mixed | Not Mixed |
| Eighth Transmitter Frequency Status + Signal Strength Modulation | Not Mixed | Not Mixed | Mixed |

In the embodiment of Table 5, the contact pressure levels of the pressure sensor corresponding to the fifth to the eighth transmitter frequency statues are all zero, so the results of signal strength modulation can also be zero. In other words, no signal is transmitted. In another embodiment, such a signal strength modulation can be a constant. This constant signal strength can be different from the signal strengths corresponding to other contact pressure levels of the pressure sensor.

Figure 2:
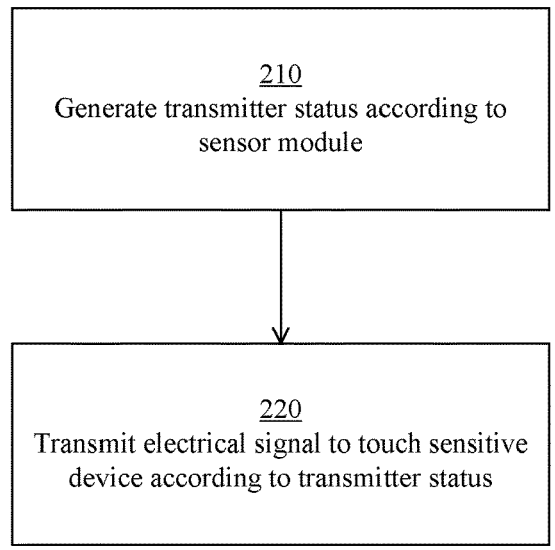
FIG. 2 is a flowchart illustrating a transmitting method in accordance with an embodiment of the present invention.

Referring to FIG. 2, a flowchart illustrating a transmitting method in accordance with an embodiment of the present invention is shown. The transmitting method is applicable to the transmitter 100 shown in FIG. 1, but not limited thereto. The transmitting method includes two steps. In step 210, a transmitter status is generated based on a status inside a sensor module included in the transmitter. In step 220, an electrical signal is transmitted to a touch sensitive device according to the transmitter status, so that after analyzing the electrical signal, the touch sensitive device is able to find out the transmitter status and a relative position of the transmitter with respect to the touch sensitive device. The electrical signal is mixed from a plurality of signals having different frequencies.

In an embodiment, a sensor inside the sensor module includes one of the following: a button, a knob, a pressure sensor (or a pressure gauge), an accelerometer or a gyroscope. The pressure sensor can be used to sense the contact pressure level between the transmitter and the touch sensitive device.

When the sensor module includes a plurality of sensors, the number of possible statues of the transmitter status is the sum of the number of possible statues of every sensor. Alternatively, in another embodiment, the transmitter status indication is one of arbitrary combinations of every sensor's status indication. In an embodiment, the status indication of a sensor inside the sensor module is the nth power of two, wherein n is an integer greater than or equal to 0.

The modulation factor of the electrical signal includes one or a combination of: frequency and strength. In an embodiment, the signal strength of the electrical signal corresponds to a status of an n-ary sensor in the sensor module. In another embodiment, the signal strengths of a first frequency and a second frequency mixed in the electrical signal correspond to a status of an n-ary sensor in the sensor module. In yet another embodiment, the signal strength of the electrical signal corresponds to a status of a first n-ary sensor in the sensor module, wherein the ratio of the signal strengths of a first frequency to a second frequency mixed in the electrical signal corresponds to a status of a second n-ary sensor in the sensor module.

One main principle of the present invention lies in the use of an electrical signal mixed from a plurality of frequencies, so that a touch sensitive device may be able to detect the position of a transmitter transmitting the electrical signal and the status of at least one sensor on the transmitter.

Figure 3:
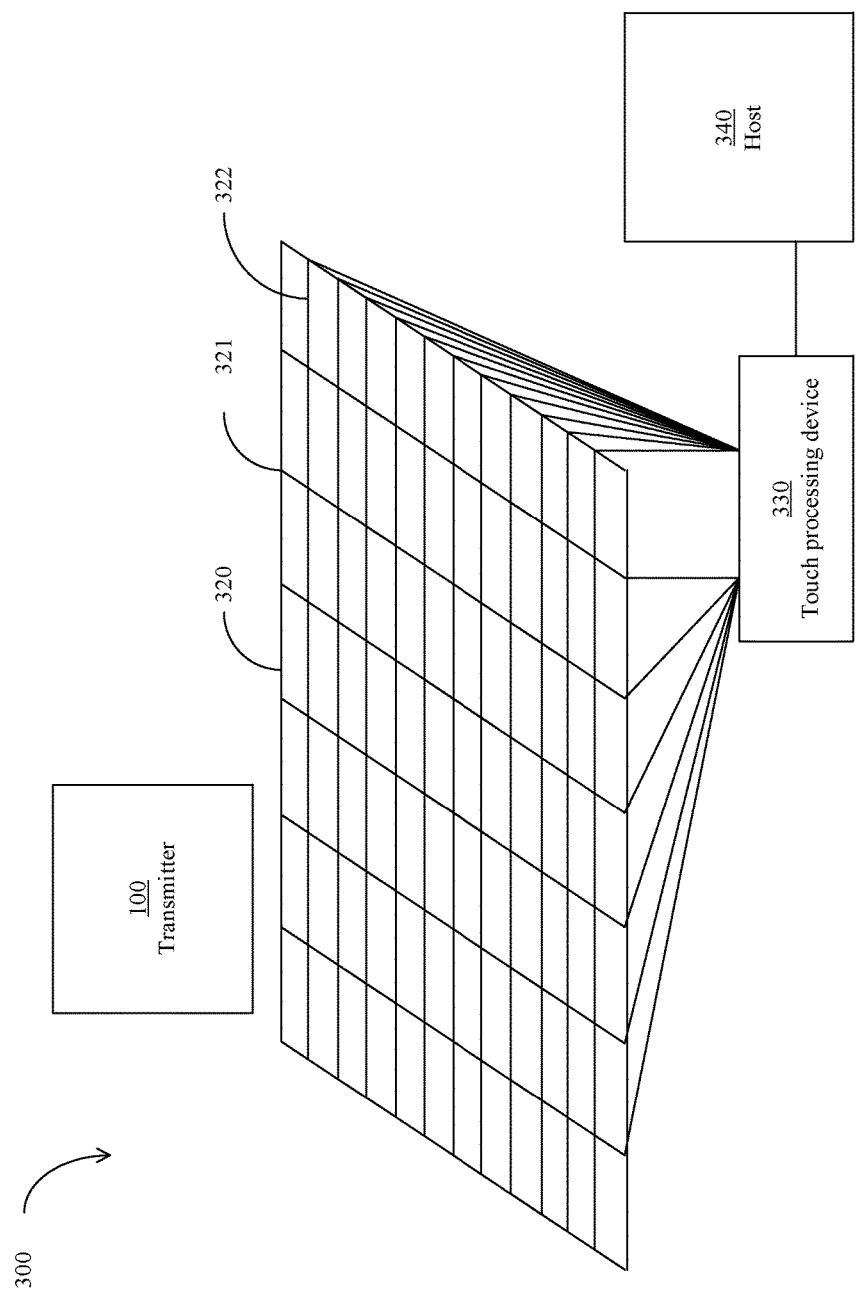
FIG. 3 is a schematic diagram depicting a touch sensitive system in accordance with an embodiment of the present invention.

Referring now to FIG. 3, a schematic diagram depicting a touch sensitive system 300 in accordance with an embodiment of the present invention is shown. The touch sensitive system 300 includes at least one transmitter 100, a touch sensitive panel 320, a touch processing device 330 and a mainframe 340. In this embodiment, the transmitter 100 is applicable to the transmitters described in the previous embodiments, especially the embodiments shown in FIGS. 1 and 2. It should also be noted that the touch sensitive system 300 may include a plurality of transmitters 100. The touch sensitive panel 320 is formed on a substrate. The touch sensitive panel 320 can be a touch sensitive screen, but the present invention does not restrict the form of the touch sensitive panel 320.

In an embodiment, a touch sensitive area of the touch sensitive panel 320 includes a plurality of first electrodes 321 and a plurality of second electrodes 322. A plurality of sensing points are formed at the intersections of these two electrodes. These first electrodes 321 and second electrodes 322 are connected to the touch processing device 330. Under mutual capacitive sensing, the first electrodes 321 can be called first conductive strips or driving electrodes and the second electrodes 322 can be called second conductive strips or sensing electrodes. The touch processing device 330 is able to know the approach or touch (approach/touch) of any external conductive object on the touch sensitive panel 320 by first providing a driving voltage to the first electrodes 321 and then measuring the signal variations of the second electrodes 322. One with ordinary skills in the art can appreciate that the touch processing device 330 may use mutual- or self-capacitive sensing methods to detect an approaching/touching event or object, and they will not be further described. In addition to mutual- or self-capacitive sensing methods, the touch processing device 330 may also detect the electrical signal emitted by the transmitter 100 in order to detect the relative position of the transmitter 100 with respect to the touch sensitive panel 320. The detection principle will be detailed in the later sections of the specification.

FIG. 3 further includes a mainframe 340, which can be an operating system such as a CPU or a main processor in an embedded system, or other types of computers. In an embodiment, the touch sensitive system 300 can be a table PC. The mainframe 340 can be a CPU for executing the operating programs of the table PC. For example, the table PC executes an Android operating system, and the mainframe 340 is an ARM processor executing the Android operating system. The present invention does not limit the form of information transmission between the mainframe 340 and the touch processing device 330 as long as the information transmitted is relevant to the approaching/touching event(s) happened on the touch sensitive panel 320.

Figure 4:
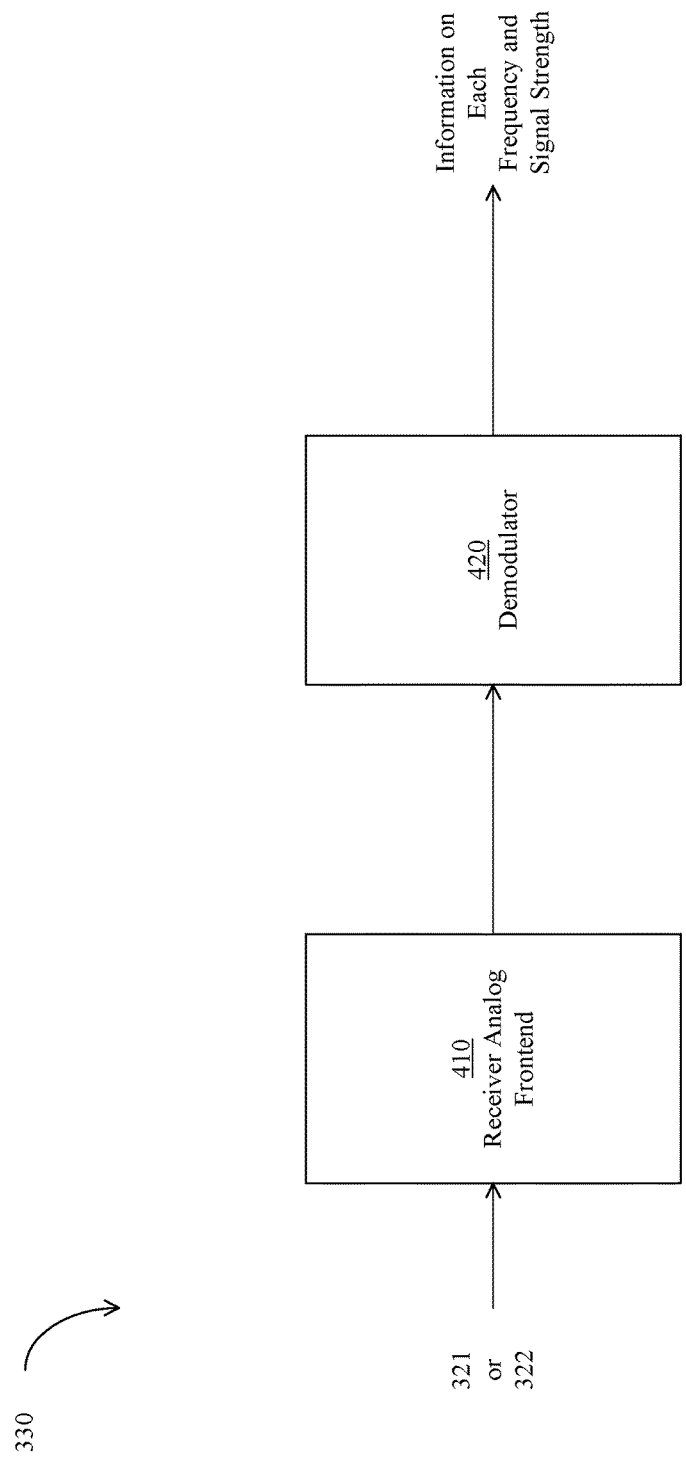
FIG. 4 is a block diagram depicting a portion of the touch processing device in accordance with an embodiment of the present invention.

Referring to FIG. 4, a block diagram depicting a portion of the touch processing device 330 in accordance with an embodiment of the present invention is shown. As mentioned earlier, the touch processing device 330 may use mutual- or self-capacitive sensing principle to detect an approaching/touching event, so details related to capacitive sensing will not be described hereinafter. The embodiment shown in FIG. 4 includes a receiver analog front end 410 and a demodulator 420.

The receiver analog front end 410 is connected to the first electrodes 321 or the second electrodes 322 described before. In an embodiment, each of the first electrodes 321 and each of the second electrodes 322 are connected to a receiver analog front end 410, respectively. In another embodiment, a plurality of first electrodes 321 form a set, and a plurality of second electrodes 322 form a set, and each set of first electrodes 321 corresponds to a receiver analog front end 410, and each set of second electrodes 322 corresponds to another receiver analog front end 410. Each receiver analog front end 410 receives in turn the signal of the first electrodes 321 or second electrodes 322 in the set. In another embodiment, a set of first electrodes 321 and a set of second electrodes 322 correspond to one receiver analog front end 410. The receiver analog front end 410 can first be connected in turn to the first electrodes 321 in the set of the first electrodes 321, and then connected in turn to the second electrodes 322 in the set of the second electrodes 322. On the contrary, the receiver analog front end 410 can first be connected in turn to the second electrodes 322 in the set of the second electrodes 322, and then connected in turn to the first electrodes 321 in the set of the first electrodes 321. In an embodiment, the touch processing device 330 may include only one receiver analog front end 410. One with ordinary skills in the art can appreciate that the present invention does not limit how the first electrodes 321 or the second electrodes 322 are configured to the receiver analog front end 410. In other words, the number of receiver analog front ends 410 included in the touch processing device 330 may be smaller than or equal to the sum of the first electrodes 321 and the second electrodes 322.

The receiver analog front end 410 may perform some filtering, amplifying or other types of analog signal processing. In some embodiments, the receiver analog front end 410 can receive the difference between two adjacent first electrodes 321, or the difference between two adjacent second electrodes 322. In an embodiment, each receiver analog front end 410 can output to a demodulator 420. In another embodiment, every $n^{th}$ receiver analog front end 410 may output to a demodulator 420. In yet another embodiment, each receiver analog front end 410 may output to N demodulators 420, wherein N is a positive integer greater than or equal to one. In some embodiments, the touch processing device 330 may include only one demodulator 420. One with ordinary skills in the art can appreciate that the present invention does not limit how the receiver analog front end(s) 410 is/are configured to the demodulator(s) 420.

The demodulator 420 is used to demodulate the electrical signal transmitted by the transmitter 100 in order to obtain information on each frequency and information on the signal strengths in the received signals of the corresponding first electrodes 321 or second electrodes 322. For example, the transmitter 100 may transmit a signal having three frequencies. The demodulator 420 may obtain the signal strengths for these three frequencies, the ratio(s) of signal strengths of each two or arbitrary two frequencies, and the overall signal strength. In the present invention, the demodulator 420 can be implemented in a digital or analog way; it is described in the following three embodiments.

Figure 5:
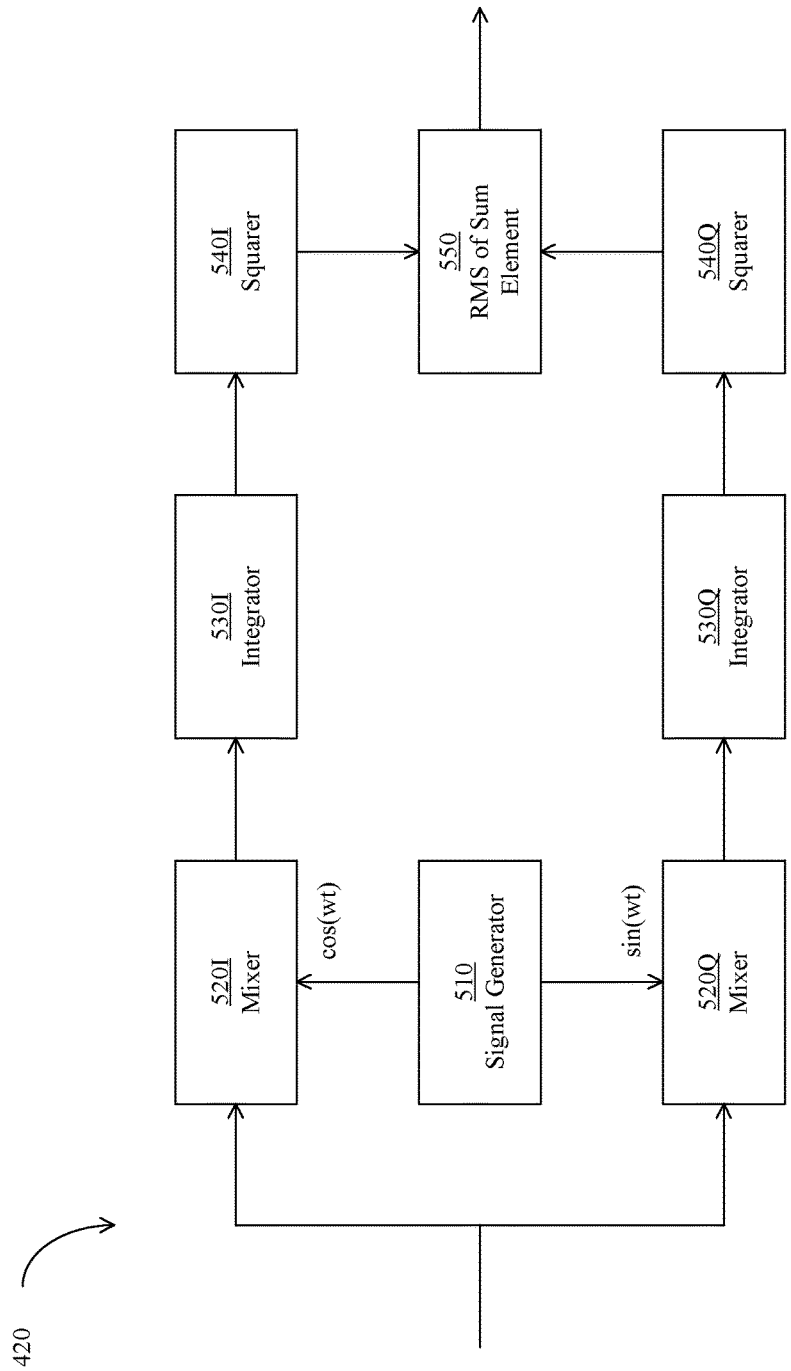
FIG. 5 is a block diagram depicting a portion of an analog demodulator in accordance with an embodiment of the present invention.

Referring to FIG. 5, a block diagram depicting a portion of an analog demodulator 420 in accordance with an embodiment of the present invention is shown. A single analog demodulator shown in FIG. 5 can be used to demodulate every frequency, or a plurality of analog demodulators shown in FIG. 5 can be used to demodulate a plurality of frequencies. For example, when the transmitter 100 transmits N frequencies, N of the analog demodulator shown in FIG. 5 are used to demodulate each of the frequencies. A signal generator 510 is used to generate signals of corresponding frequencies.

An analog signal received from the receiver analog front end 410 can be passed through an optional amplifier (not shown) and then to two mixers 520I and 520Q. The mixer 520I receives a cosine signal outputted by the signal generator 510, while the mixer 520Q receives a sine signal outputted by the signal generator 510. The mixer signals outputted by the mixers 520I and 520Q are then sent to integrators 530I and 530Q, respectively. Then, the integrated signals are sent to squarers 540I and 540Q by the integrators 530I and 530Q, respectively. Finally, the outputs of the squarers 540I and 540Q are summed and then root-mean-squared by a "Root Mean Square (RMS) of Sum" element. As such, the signal strengths corresponding to the signal frequencies generated by the signal generator 510 can be obtained. After the signal strengths of all frequencies are obtained, the ratio(s) of the signal strengths of each two or arbitrary two frequencies and the overall signal strength can then be generated.

Figure 6:
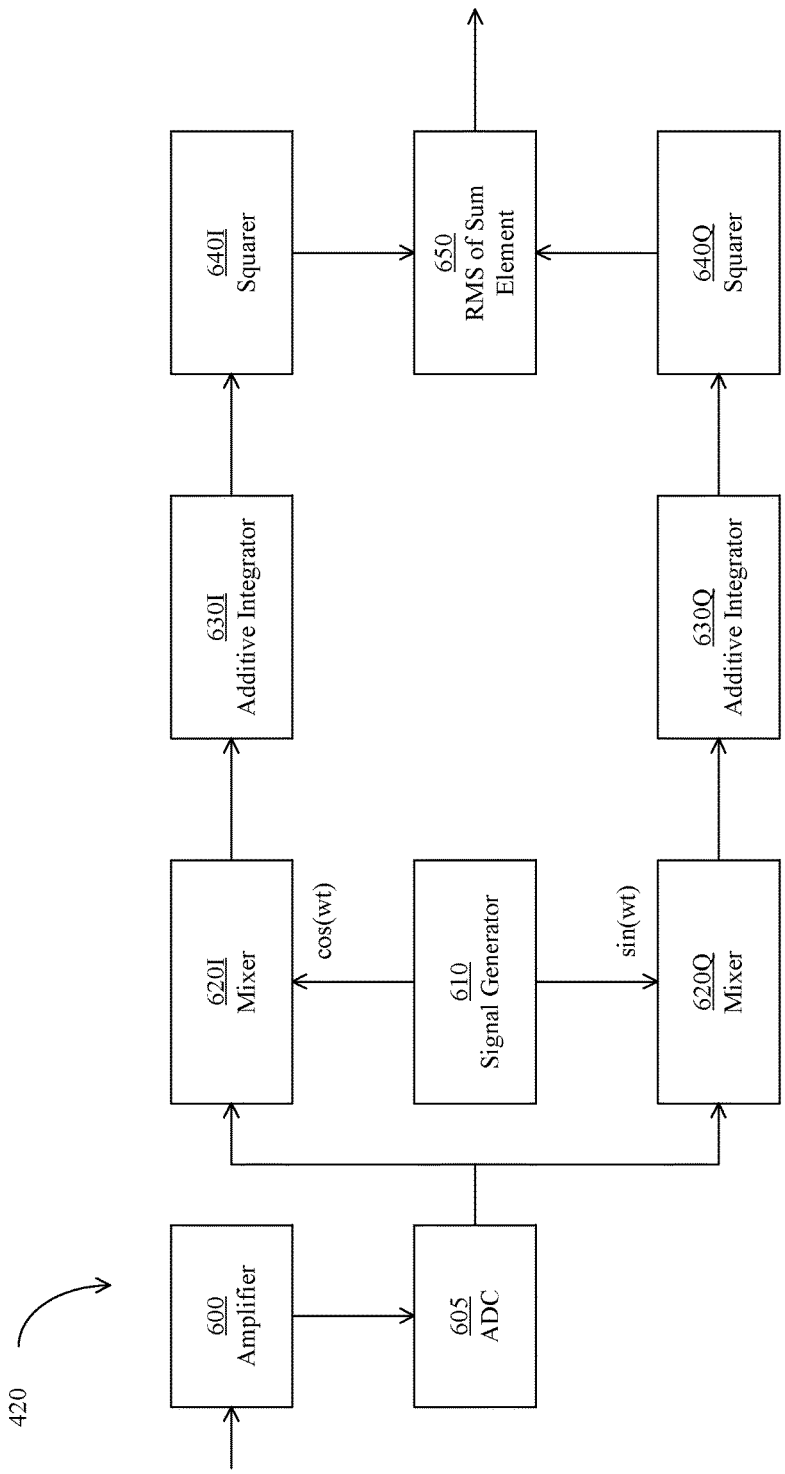
FIG. 6 is a block diagram depicting a portion of a digital demodulator in accordance with an embodiment of the present invention.

Referring to FIG. 6, a block diagram depicting a portion of a digital demodulator 420 in accordance with an embodiment of the present invention is shown. Compared to the embodiment shown in FIG. 5, the embodiment shown in FIG. 6 is carried out in a digital manner. Similarly, a single digital demodulator shown in FIG. 6 can be used to demodulate every frequency, or a plurality of the digital demodulators shown in FIG. 6 can be used to demodulate a plurality of frequencies. For example, when the transmitter 100 transmits N frequencies, N of the digital demodulator shown in FIG. 6 are used demodulate each of the frequencies. A signal generator 610 is used to generate digital signals of corresponding frequencies.

An analog signal received from the receiver analog front end 410 can be passed through an optional amplifier 600 and then to an analog-to-digital converter (ADC) 605. The sampling frequency of the ADC 605 will correspond to the frequency of the signal transmitted by the signal generator 610. In other words, when the ADC 605 is performing one sampling, the signal generator 610 will send out signals to two mixers 620I and 620Q once. The mixer 620I receives a cosine signal outputted by the signal generator 610, while the mixer 620Q receives a sine signal outputted by the signal generator 610. The mixer signals outputted by the mixers 620I and 620Q are then outputted to addition integrators 630I and 630Q, respectively. Then, the addition-integrated signals are sent to squarers 640I and 640Q by the addition integrators 630I and 630Q, respectively. Finally, the outputs of the squarers 640I and 640Q are summed and root-mean-squared by a "Root Mean Square (RMS) of Sum" element. As such, the signal strengths corresponding to the signal frequencies generated by the signal generator 610 can be obtained. After the signal strengths of all frequencies are obtained, the ratios of the signal strengths of each two frequencies and the overall signal strength can then be generated.

Figure 7:
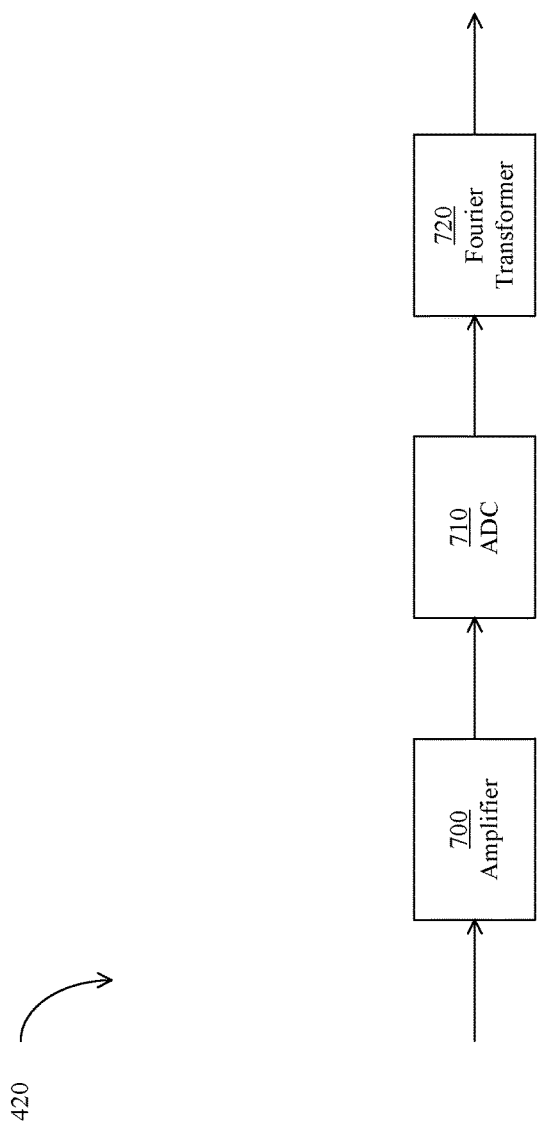
FIG. 7 is a block diagram depicting a portion of a digital demodulator in accordance with an embodiment of the present invention.

Referring to FIG. 7, a block diagram depicting a portion of a digital demodulator 420 in accordance with an embodiment of the present invention is shown. The embodiment shown in FIG. 7 is carried out in a digital manner, and a single digital demodulator shown in FIG. 7 can be used to demodulate every frequency. An analog signal received from the receiver analog front end 410 can be passed through an optional amplifier 700 and then to an analog-to-digital converter (ADC) 705. Then, the outputted digital signal is sent to a Fourier transformer 720 to demodulate the signal strength of each frequency on the frequency domain. The above Fourier transformer can be a digitalized Fast Fourier transformer.

Figure 8:
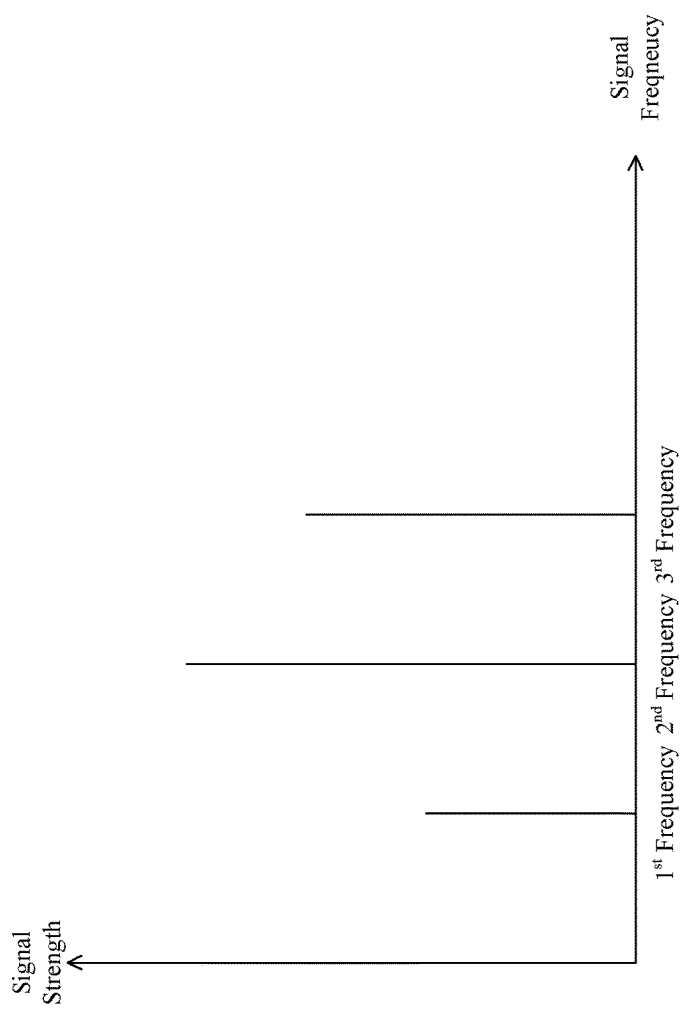
FIG. 8 is a schematic diagram depicting the result of demodulation according to the digital demodulator of FIG. 7.

Referring to FIG. 8, a schematic diagram depicting the result of demodulation according to the digital demodulator 420 of FIG. 7 is shown. The result shown in FIG. 8 is merely an illustration, in addition to being represented by a diagram; other kinds of data structure can be used to store the result of demodulation. The horizontal axis shown in FIG. 8 indicates the signal frequency, and the vertical axis thereof indicates the signal strength. The calculated result from the Fourier transformer 720 gives the signal strengths corresponding to N frequencies possibly transmitted by the transmitter 100. In an embodiment, a threshold can be set for the signal strength. Only a signal with strength greater than the threshold would be regarded as a signal having a corresponding frequency. When the signal strength of each frequency is obtained, the ratios of each two frequencies and the overall signal strength can then be calculated.

Although the embodiments of the three demodulators 420 provided in FIGS. 5 to 7 can be implemented in the touch processing device 330 shown in FIG. 3, but the present invention does not restrict that the touch processing device 330 must implement all the steps of the demodulator 420. In some embodiments, some steps of the demodulator 420 can be performed by the mainframe 340. It should be noted that although the embodiments of the demodulators 420 can be implemented by specific hardware, but one with ordinary skills in the art can appreciate that each elements of the demodulators 420 can be implemented through software or firmware. For example, the mixers can be implemented by multiplication, and the addition integrators can be implemented by addition. Multiplication and addition are among the most common operation instructions in ordinary processors.

Figure 9A:
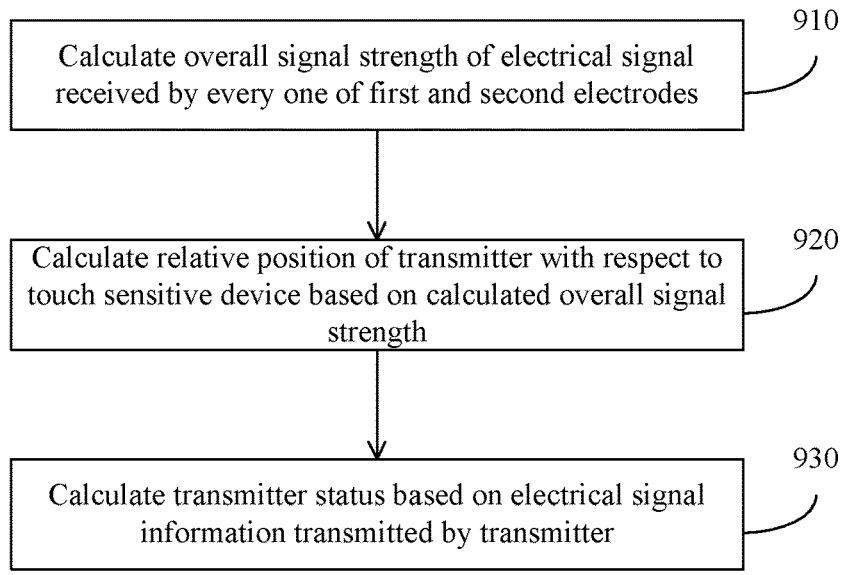
FIG. 9A is a flowchart illustrating a method for sensing a transmitter in accordance with an embodiment of the present invention.

Referring to FIG. 9A, a flowchart illustrating a method for sensing a transmitter in accordance with an embodiment of the present invention is shown. In step S910, the overall signal strength of the electrical signal received by every one of the first and second electrodes is calculated. Step 910 can be implemented using the embodiments shown in FIGS. 3 to 7. Then, in step 920, based on the calculated overall signal strength, a relative position of the transmitter with respect to a touch sensitive device is calculated. In an embodiment, the position of the transmitter is thought to be corresponding to the first and second electrodes having the largest overall signal strengths. In another embodiment, the position of the transmitter is thought to be corresponding to the centroid of adjacent first and second electrodes having the largest overall signal strengths, the magnitude of the masses of these electrodes correspond to the strength of the signals. Finally, in an optional step 930, based on information of the electrical signal transmitted by the transmitter, a transmitter status is calculated. One with ordinary skills in the art can appreciate that the implementation of step 930 can be deduced from the tables previously described.

Figure 9B:
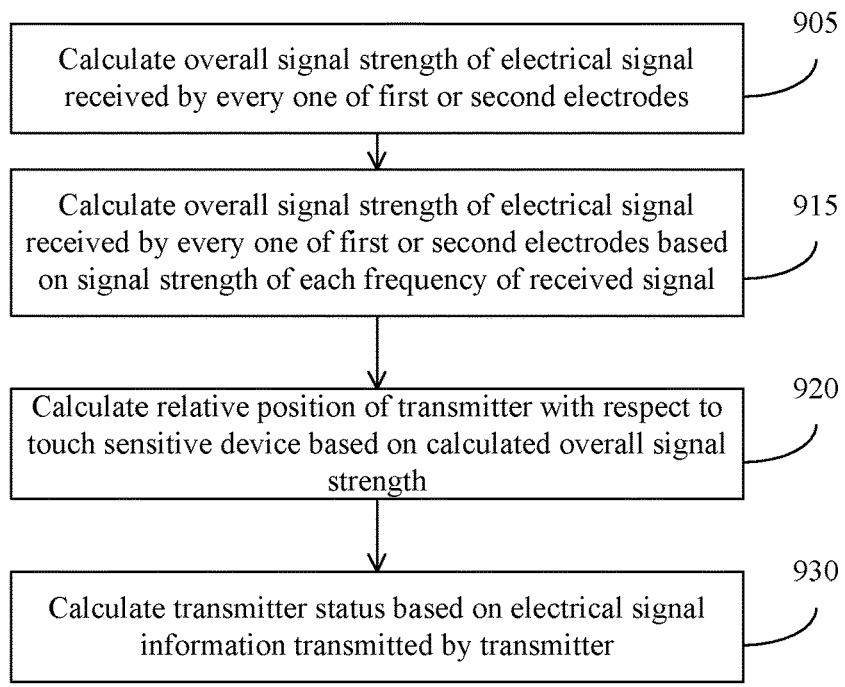
FIG. 9B is a flowchart illustrating a method for sensing a transmitter in accordance with an embodiment of the present invention.

Referring to FIG. 9B, a flowchart illustrating a method for sensing a transmitter in accordance with an embodiment of the present invention is shown. In step S905, the overall signal strength of the electrical signal received by every first or second electrode is calculated. Once the electrical signal received by a first or second electrode is demodulated, the frequencies of the signal transmitted by the transmitter can be known. For example, if the transmitter transmits a first frequency and a second frequency, but not a third frequency, then in the calculation of overall signal strengths of another electrode carried out in step 915, the calculation of the third frequency can be omitted. If the digital demodulator shown in FIG. 7 is employed, then the method shown in FIG. 9B is not required. However, if the demodulator described with respect to FIG. 5 or FIG. 6 is employed, and that the number of demodulators is not be enough to scan all frequencies in one go, then the method of FIG. 9B can save some time and calculation resources. Moreover, if after the calculations of the first electrodes or the second electrodes, no electrical signal transmitted by the transmitter is found, step 915 can be bypassed. On the contrary, if the electrical signal transmitted by the transmitter is found, then step 915 can calculate the overall signal strength of the electrical signal received by another electrode based on the signal strength of each frequency of the received electrical signal. The descriptions of the embodiment of FIG. 9A apply to the remaining steps 920 and 930.

It should be noted that in the processes of FIGS. 9A and 9B, if no cause-and-effect relationships or order between the steps are mentioned, then the present invention does not limit the order in which these steps are carried out. In addition, in steps 905, 910 and 915, the overall signal strength of the electrical signal of every first and/or second electrode(s) is mentioned. In an embodiment, if the touch sensitive system 300 includes only a single transmitter 100, the processes of FIGS. 9A and 9B will be modified to: if the overall strength of the electrical signal received by at least one first electrode and second electrode is calculated to be greater than a threshold, then execute steps 920 and 930.

In summary, one main principle of the present invention lies in that the signal strengths corresponding to a plurality of frequencies in the signal received by the first electrodes and the second electrodes are detected in order to calculate a relative position of the transmitter with respect to the touch sensitive device, and the statues of various sensors on the transmitter are further known based on the transmitter status. Moreover, the present invention can also use the touch sensitive electrodes of the capacitive touch sensitive panel to allow the same capacitive touch sensitive panel to perform capacitive sensing while carrying out the detection of the transmitter. In other words, the same capacitive touch sensitive panel can be used for the detections of fingers, palms, as well as transmitter-type styli.

In many of the current capacitive detections, multi-touch detection is supported. In the present invention, detections of a plurality of transmitters are supported, and detection of a single object with a plurality of transmitters is also supported. In an embodiment, the plurality of transmitters can be the same type of transmitters. For example, the plurality of frequencies mixed by the transmitters are all the same, but the ratios of the signal strengths of the mixed frequencies in each transmitter is different. Alternatively, through configurations of software or hardware, each transmitter may mix different frequencies based on the different configurations. In another embodiment, the plurality of transmitters can be different types of transmitters. In other words, at least one of the frequencies mixed by the plurality of transmitters is different. The present invention does not limit whether the plurality of transmitters are the same or not, and corresponding touch sensitive panel and touch processing device distinguish the plurality of transmitters based on the different electrical signals transmitted.

Figure 10:
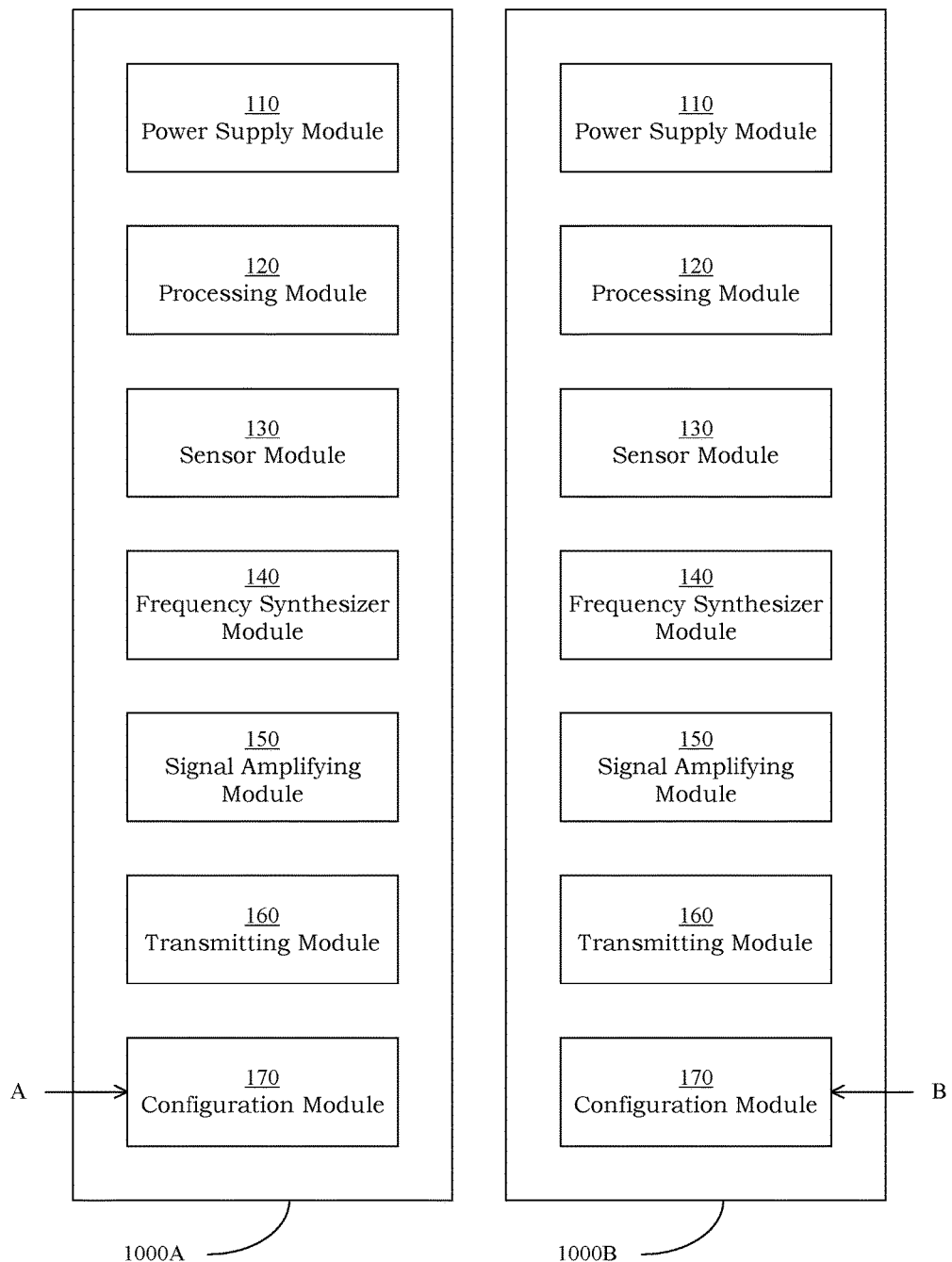
FIG. 10 is a block diagram illustrating two equivalent transmitters in accordance with an embodiment of the present invention.

Referring to FIG. 10, a block diagram illustrating two equivalent transmitters 1000 in accordance with an embodiment of the present invention is shown. In this embodiment, transmitters 1000A and 1000B are of the same form. Compared to the transmitter 100 shown in FIG. 1, the transmitter 1000 includes an optional configuration module 170. The details about the rest of the modules can be found by referring to FIG. 1 and other embodiments, and thus will not be described further herein.

In the embodiment shown in FIG. 10, the sensor module 130 includes only one button and a pressure sensor at the tip of the stylus, and the frequency synthesizer module 140 is capable of synthesizing three frequencies. Therefore, for transmitters 1000A and 1000B, there are at most four transmitter statues. However, in order to save power, when the pressure sensor does not detect any pressure, the transmitters 1000 will not transmit any electrical signal. Thus, as shown in Table 6 below, as long as there is no contact pressure detected by the pressure sensor, the transmitter status is categorized as the third transmitter status regardless of whether the button is pressed or released. From Table 6, it is clear that when at the first and second transmitter statues, the transmitters 1000 need to transmit an electrical signal. When the system includes both of the transmitters 1000A and 1000B, there are four different scenarios.

TABLE 6

|  | Pressure Sensor | Button |
| --- | --- | --- |
| First Transmitter Status | Contact Pressure | Pressed |
| Second Transmitter Status | Contact Pressure | Released |
| Third Transmitter Status | No Contact Pressure | Pressed |
| Third Transmitter Status | No Contact Pressure | Released |

As mentioned before, the frequency synthesizer module 140 may synthesize three different frequencies, so using the arrangements shown in Table 7, the touch sensitive device may simultaneously distinguish between the transmitters 1000A and 1000B concurrently pressing on the touch sensitive panel. It should be noted the signals made up of three frequencies may have eight different arrangements, excluding the arrangement in which no frequency is mixed, there are still seven other arrangements that can be used.

TABLE 7

|  | First Frequency | Second Frequency | Third Frequency |
| --- | --- | --- | --- |
| First Transmitter Status of Transmitter 1000A | Mixed | Not Mixed | Mixed |
| Second Transmitter Status of Transmitter 1000A | Mixed | Not Mixed | Not Mixed |
| Third Transmitter Status of Transmitter 1000A | Not Mixed | Not Mixed | Not Mixed |
| First Transmitter Status of Transmitter | Not Mixed | Mixed | Mixed |

TABLE 7-continued

|  | First Frequency | Second Frequency | Third Frequency |
|---|---|---|---|
| 1000B | | | |
| Second Transmitter Status of Transmitter 1000B | Not Mixed | Mixed | Not Mixed |
| Third Transmitter Status of Transmitter 1000B | Not Mixed | Not Mixed | Not Mixed |
| Unallocated | Mixed | Mixed | Mixed |
| Unallocated | Mixed | Mixed | Not Mixed |
| Unallocated | Not Mixed | Not Mixed | Mixed |

In an embodiment, if the pressure sensor of transmitter 1000B does not detect any contact pressure, and the transmitter 1000B still continues to transmit an electrical signal to allow the touch sensitive device to detect the transmitter 1000B suspending above or near the touch sensitive panel, then the transmitter statues of the transmitter 1000 will be restored to four statues as shown in Table 6-1.

TABLE 6-1

|  | Pressure Sensor | Button |
|---|---|---|
| First Transmitter Status | Contact Pressure | Pressed |
| Second Transmitter Status | Contact Pressure | Released |
| Third Transmitter Status | No Contact Pressure | Pressed |
| Fourth Transmitter Status | No Contact Pressure | Released |

In the case of the transmitter 1000A having three transmitter statues and the transmitter 1000B having four transmitter statues, these two transmitters may mix the three frequencies according to the arrangements shown in Table 7-1.

TABLE 7-1

|  | First Frequency | Second Frequency | Third Frequency |
|---|---|---|---|
| First Transmitter Status of Transmitter 1000A | Mixed | Not Mixed | Mixed |
| Second Transmitter Status of Transmitter 1000A | Mixed | Not Mixed | Not Mixed |
| Third Transmitter Status of Transmitter 1000A | Not Mixed | Not Mixed | Not Mixed |
| First Transmitter Status of Transmitter 1000B | Not Mixed | Mixed | Mixed |
| Second Transmitter Status of Transmitter 1000B | Not Mixed | Mixed | Not Mixed |
| Third Transmitter Status of Transmitter 1000B | Mixed | Mixed | Mixed |
| Fourth Transmitter Status of Transmitter 1000B | Mixed | Mixed | Not Mixed |
| Unallocated | Not Mixed | Not Mixed | Mixed |

Of course, one with ordinary skills in the art can appreciate that the above arrangements of Table 7 or Table 7-1 are merely examples of the present invention. In practice, transmitter statues can be made to correspond to non-repetitive frequency mixings. For example, Table 7-1 is rearranged to Table 7-2, which still satisfies the scenarios where there are two concurrent transmitters in the system.

TABLE 7-2

|  | First Frequency | Second Frequency | Third Frequency |
|---|---|---|---|
| First Transmitter Status of Transmitter 1000B | Mixed | Not Mixed | Mixed |
| Second Transmitter Status of Transmitter 1000B | Mixed | Not Mixed | Not Mixed |
| Third Transmitter Status of Transmitter 1000A | Not Mixed | Not Mixed | Not Mixed |
| Second Transmitter Status of Transmitter 1000A | Not Mixed | Mixed | Mixed |
| First Transmitter Status of Transmitter 1000A | Not Mixed | Mixed | Not Mixed |
| Fourth Transmitter Status of Transmitter 1000B | Mixed | Mixed | Mixed |
| Third Transmitter Status of Transmitter 1000B | Mixed | Mixed | Not Mixed |
| Unallocated | Not Mixed | Not Mixed | Mixed |

Moreover, the system may also include another transmitter 1000C different from the transmitters 1000A and 1000B. In an embodiment, the sensor module 130 of the transmitter 1000C only has a pressure sensor, so the transmitter 1000C has only two transmitter statues: the first transmitter status indicates that contact pressure is detected, and the second transmitter status indicates no contact pressure detected. In this embodiment, the arrangements shown in Table 7-3 can be used to accommodate a touch sensitive system with three transmitters 1000.

TABLE 7-3

|  | First Frequency | Second Frequency | Third Frequency |
|---|---|---|---|
| First Transmitter Status of Transmitter 1000B | Mixed | Not Mixed | Mixed |
| Second Transmitter Status of Transmitter 1000B | Mixed | Not Mixed | Not Mixed |
| Third Transmitter Status of Transmitter 1000A and Second Transmitter Status of Transmitter 1000C | Not Mixed | Not Mixed | Not Mixed |
| Second Transmitter Status of Transmitter 1000A | Not Mixed | Mixed | Mixed |
| First Transmitter Status of Transmitter 1000A | Not Mixed | Mixed | Not Mixed |
| Fourth Transmitter Status of Transmitter 1000B | Mixed | Mixed | Mixed |
| Third Transmitter Status of Transmitter 1000B | Mixed | Mixed | Not Mixed |
| First Transmitter Status of Transmitter 1000C | Not Mixed | Not Mixed | Mixed |

It should be noted that in the embodiment shown in Table 7-3, the frequency synthesizer module 140 of the transmitter 1000C may only supports a single frequency (third frequency) without the need for carrying out frequency mixing.

In other words, the transmitter 1000C may omit the frequency synthesizer module 140. Similarly, in this embodiment, the transmitter 1000C may omit the configuration module 170, since the transmitter 1000C supporting one frequency does not require any configurations.

In an embodiment, the frequency mixings of the transmitters 1000 above have already been setup in the processing module 120, so the configuration module 170 only needs to configure which transmitter should take on the role of the transmitter 1000A or the transmitter 1000B. In this case, the configuration module 170 may simply be a human-machine interface, such as a button, a switch, a tab, a knob, or a wheel that can be switched between role A and role B. Upon manufacturing a transmitter 1000, it can be set to assume a default role. One with ordinary skills in the art can appreciate that, although only two roles are mentioned in the above examples, the touch sensitive device can detect transmitters 1000 assuming more roles, or the sensor module 130 in each transmitter 1000 can have more sensor statues (unlike the above example where there are only one pressure sensor and one button), as long as the amount of mixing frequencies is increased in the frequency synthesizer module.

In another embodiment, the frequency mixing of the transmitters 1000 can be configured through the more complex configuration module 170. For example, the configuration module 170 can be a physical communication interface, such as a Universal Serial Bus (USB) or other wired interfaces. With the interface provided by the configuration module 170, the corresponding relationships between the transmitter statues of the transmitters 1000 and the frequency mixings can be configured via software. In some embodiments, the configuration module 170 may also be a wireless communication interface, such as a wireless LAN or Bluetooth interface.

It should be noted that in the case that the configuration module 170 is embodied with a switch or a tab for configuring the roles, corresponding configurations in the touch sensitive device may not be required. This is because, upon shipment, the transmitters 1000 and the touch sensitive device would already have the same corresponding relationships between transmitter statues and frequency mixings stored therein. However, if the configuration module 170 can rearrange the corresponding relationships between transmitter statues and frequency mixings via software, then the touch sensitive device must be adjusted accordingly.

In the present invention, the touch sensitive device can still detect two transmitters 1000 assuming the same role, and can also distinguish between the two transmitters 1000 due to the different transmitter statues of the transmitters 1000, and further depict the trajectories of the individual transmitters. For example, one is in the first transmitter status while the other is in the second transmitter status. If these two transmitters are in the same transmitter status, the touch sensitive device may not be able to distinguish between the two transmitters based merely on the electrical signals transmitted by them. Trajectory prediction techniques are required to depict the trajectories of the individual transmitters.

In an embodiment, the present invention provides a set of transmitters which transmits signals concurrently. The set includes a first role transmitter 1000A configured to transmit a first electrical signal according to a first role transmitter status to a touch sensitive device; and a second role transmitter 1000B configured to transmit a second electrical signal according to a second role transmitter status to said touch sensitive device. In consequence, the touch sensitive device is configured to analyze the first and the second electrical signals concurrently transmitted and to get the first and the second role transmitter statuses as well as a first relative position between the first role transmitter 1000A and the touch sensitive device and a second relative position between the second role transmitter 1000B and the touch sensitive device.

In an embodiment, the first and the second role transmitters are of the same type. In another embodiment, the first and the second role transmitters are of different types.

The first electrical signal is made up of a mixture of a plurality of frequencies. In an embodiment, the second electrical signal is made up of the mixture of the plurality of frequencies. In another embodiment, the second electrical signal is made up of a subset of the mixture of the plurality of frequencies.

The first role transmitter includes a first configuration module for configuring the role of the first role transmitter. The second role transmitter includes a second configuration module for configuring the role of the second role transmitter. When the roles of the first and the second role transmitters are different, the frequency mixing of the first electrical signal is different from the frequency mixing of the second electrical signal.

In an embodiment, the first configuration module includes a human-machine interface to allow a user to manually configure the role of the first role transmitter. In another embodiment, the first configuration module includes a wireless communication interface or a wired communication interface connected to a computer to allow a user to configure the role of the first role transmitter via the wireless communication interface or the wired communication interface using the computer. The user may configure the corresponding relationships between the first role transmitter status and the frequencies mixed in the first electrical signal.

Figure 11:
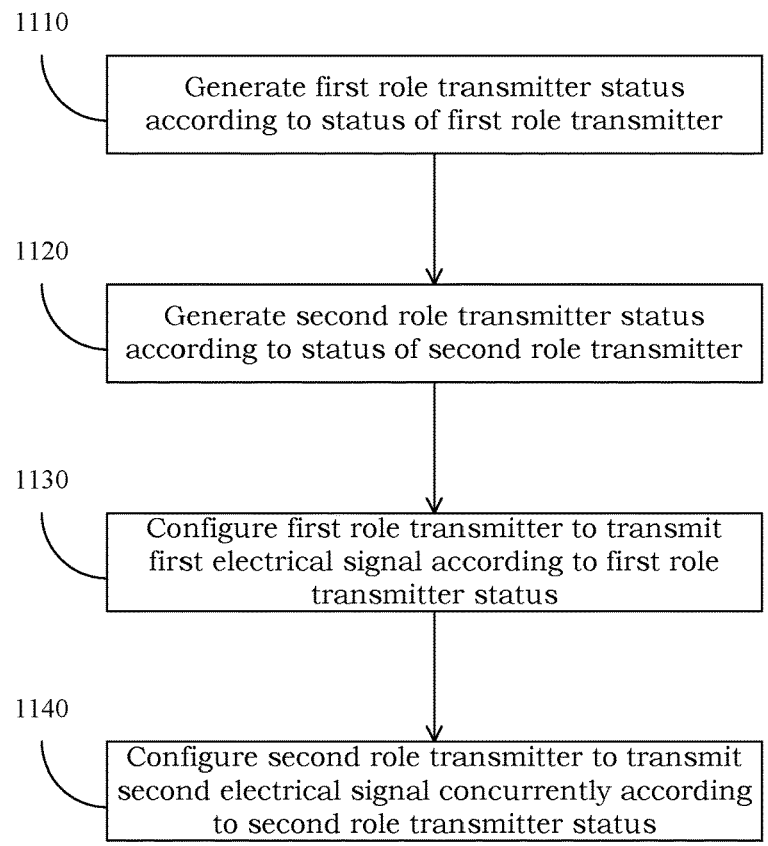
FIG. 11 is a block diagram illustrating a transmitting method in accordance with an embodiment of the present invention.

Referring to FIG. 11, a block diagram illustrating a transmitting method in accordance with an embodiment of the present invention is shown. Among the steps shown in FIG. 11, if no causal relationship is specified, then the present invention does not limit the order in which they are executed. The transmitting method is applicable to a set of transmitters which transmit signals concurrently. The transmitter set includes a first role transmitter and a second role transmitter. In step 1110, a first role transmitter status is generated according to a status of the first role transmitter. In step 1120, a second role transmitter status is generated according to a status of the second role transmitter. Then, in step 1130, the first role transmitter is configured to transmit a first electrical signal according to the first role transmitter status. In step 1140, the second role transmitter is configured to transmit a second electrical signal concurrently according to the second role transmitter status, enabling a touch sensitive device to analyze the first and the second electrical signals concurrently transmitted and to get the first and the second role transmitter statuses as well as a first relative position between the first role transmitter and the touch sensitive device and a second relative position between the second role transmitter and the touch sensitive device.

In an embodiment, the first and the second role transmitters are of the same type. In another embodiment, the first and the second role transmitters are of different types.

The transmitting method may further include mixing a plurality of frequencies to generate the first electrical signal. In an embodiment, the transmitting method may further include mixing the plurality of frequencies to generate the second electrical signal. In another embodiment, the transmitting method may further include mixing a subset of the plurality of frequencies to generate the second electrical signal.

The transmitting method may further include configuring the role of the first role transmitter; and configuring the role of the second role transmitter. When the roles of the first and the second role transmitters are different, the frequency mixing of the first electrical signal is different from the frequency mixing of the second electrical signal.

The transmitting method may further include allowing a user to manually configure the role of the first role transmitter via a human-machine interface. In another embodiment, the transmitting method may further include connecting to a computer via a wireless communication interface or a wired communication interface of the first role transmitter to allow a user to configure the role of the first role transmitter via the wireless communication interface or the wired communication interface using the computer. The transmitting method may further include configuring the corresponding relationships between the first role transmitter status and the frequencies mixed in the first electrical signal.

One of the principles of the present invention lies in providing a set of transmitters which transmit different electrical signals, thereby allowing a touch sensitive device to obtain the statues of various transmitters according to the different electrical signals as well as relative positions between the respective transmitters and the touch sensitive device.

What is claimed is:

1. A transmitter set for transmitting signals concurrently, comprising:
a first role transmitter configured to actively transmit a first electrical signal according to a first role transmitter status to a capacitive touch sensitive device, wherein said first electrical signal is not resonant to any signals emitted from said capacitive touch sensitive device; and
a second role transmitter configured to actively transmit a second electrical signal according to a second role transmitter status to said capacitive touch sensitive device, wherein said second electrical signal is not resonant to any signals emitted from said capacitive touch sensitive device, allowing the capacitive touch sensitive device to analyze the first and the second electrical signals concurrently transmitted and to get the first and the second role transmitter statuses as well as a first relative position between the first role transmitter and the capacitive touch sensitive device and a second relative position between the second role transmitter and the capacitive touch sensitive device.

2. The transmitter set of claim 1, wherein the first and the second role transmitters are of the same type.

3. The transmitter set of claim 1, wherein the first electrical signal is made up of a mixture of a plurality of frequencies.

4. The transmitter set of claim 3, wherein the second electrical signal is made up of the mixture of the plurality of frequencies.

5. The transmitter set of claim 3, wherein the second electrical signal is made up of a subset of the mixture of the plurality of frequencies.

6. The transmitter set of claim 1, wherein the first role transmitter includes a first configuration module for configuring the role of the first role transmitter, and the second role transmitter includes a second configuration module for configuring the role of the second role transmitter.

7. The transmitter set of claim 6, wherein when the roles of the first and the second role transmitters are different, the frequency mixing of the first electrical signal is different from the frequency mixing of the second electrical signal.

8. The transmitter set of claim 6, wherein the first configuration module includes a human-machine interface to allow a user to manually configure the role of the first role transmitter.

9. The transmitter set of claim 6, wherein the first configuration module includes a wireless communication interface or a wired communication interface connected to a computer to allow a user to configure the role of the first role transmitter via the wireless communication interface or the wired communication interface using the computer.

10. The transmitter set of claim 9, wherein the user is allowed to configure the corresponding relationships between the first role transmitter status and the frequencies mixed in the first electrical signal.

11. A transmitting method applicable to a set of transmitters including a first role transmitter and a second role transmitter for transmitting signals concurrently, the method comprising:
generating a first role transmitter status according to a status of the first role transmitter;
generating a second role transmitter status according to a status of the second role transmitter;
configuring the first role transmitter to actively transmit a first electrical signal according to the first role transmitter status, wherein said first electrical signal is not resonant to any signals emitted from a capacitive touch sensitive device; and
configuring the second role transmitter to actively transmit a second electrical signal concurrently according to the second role transmitter status, wherein said second electrical signal is not resonant to any signals emitted from said capacitive touch sensitive device, enabling a capacitive touch sensitive device to analyze the first and the second electrical signals concurrently transmitted and to get the first and the second role transmitter statuses as well as a first relative position between the first role transmitter and the capacitive touch sensitive device and a second relative position between the second role transmitter and the capacitive touch sensitive device.

12. The transmitting method of claim 11, wherein the first and the second role transmitters are of the same type.

13. The transmitting method of claim 11, further comprising mixing a plurality of frequencies to generate the first electrical signal.

14. The transmitting method of claim 13, further comprising mixing the plurality of frequencies to generate the second electrical signal.

15. The transmitting method of claim 13, further comprising mixing a subset of the plurality of frequencies to generate the second electrical signal.

16. The transmitting method of claim 11, further comprising:
configuring the role of the first role transmitter; and
configuring the role of the second role transmitter.

17. The transmitting method of claim 16, wherein when the roles of the first and the second role transmitters are different, the frequency mixing of the first electrical signal is different from the frequency mixing of the second electrical signal.

18. The transmitting method of claim 16, further comprising allowing a user to manually configure the role of the first role transmitter via a human-machine interface.

19. The transmitting method of claim 16, further comprising connecting to a computer via a wireless communication interface or a wired communication interface of the first role transmitter to allow a user to configure the role of the first role transmitter via the wireless communication interface or the wired communication interface using the computer.

20. The transmitting method of claim 19, further comprising configuring the corresponding relationships between the first role transmitter status and the frequencies mixed in the first electrical signal.

21. A touch sensitive system, comprising:
- a first role transmitter configured to transmit a first electrical signal according to a first role transmitter status to a capacitive touch sensitive device, wherein said first electrical signal is not resonant to any signals emitted from said capacitive touch sensitive device;
- a second role transmitter configured to transmit a second electrical signal according to a second role transmitter status to said capacitive touch sensitive device, wherein said second electrical signal is not resonant to any signals emitted from said capacitive touch sensitive device; and
- the capacitive touch sensitive device configured to analyze the first and the second electrical signals concurrently transmitted and to get the first and the second role transmitter statuses as well as a first relative position between the first role transmitter and the capacitive touch sensitive device and a second relative position between the second role transmitter and the capacitive touch sensitive device.

* * * * *